United States Patent
Oura et al.

(10) Patent No.: US 11,762,306 B2
(45) Date of Patent: Sep. 19, 2023

(54) ELECTROCONDUCTIVE ROLL

(71) Applicant: NOK CORPORATION, Tokyo (JP)

(72) Inventors: Kousuke Oura, Fujisawa (JP); Shogo Suzuki, Fujisawa (JP); Satoshi Fukuoka, Fujisawa (JP); Kenji Sasaki, Fujisawa (JP)

(73) Assignee: NOK CORPORATION

( * ) Notice: Subject to any disclaimer, the term of this patent is extended or adjusted under 35 U.S.C. 154(b) by 401 days.

(21) Appl. No.: 17/258,583

(22) PCT Filed: Aug. 29, 2019

(86) PCT No.: PCT/JP2019/033941
§ 371 (c)(1),
(2) Date: Jan. 7, 2021

(87) PCT Pub. No.: WO2020/050131
PCT Pub. Date: Mar. 12, 2020

(65) Prior Publication Data
US 2021/0255556 A1    Aug. 19, 2021

(30) Foreign Application Priority Data
Sep. 5, 2018  (JP) .................................. 2018-165845

(51) Int. Cl.
*G03G 15/02* (2006.01)
*G03G 5/04* (2006.01)

(52) U.S. Cl.
CPC ..................... *G03G 5/04* (2013.01)

(58) Field of Classification Search
CPC ............... G03G 15/00; G03G 15/02
USPC ................................ 399/115, 168, 174, 176
See application file for complete search history.

(56) References Cited

U.S. PATENT DOCUMENTS

| | | |
|---|---|---|
| 2009/0123195 A1 | 5/2009 | Kusaba et al. |
| 2011/0299887 A1 | 12/2011 | Miyaji et al. |
| 2013/0343783 A1 | 12/2013 | Miyaji et al. |
| 2016/0266511 A1 | 9/2016 | Kuroda |
| 2019/0025727 A1 | 1/2019 | Oura et al. |

FOREIGN PATENT DOCUMENTS

| | | |
|---|---|---|
| CN | 107379586 A | 11/2017 |
| EP | 2071412 A1 | 6/2009 |
| EP | 3073324 A1 | 9/2016 |
| JP | H10048916 A | 2/1998 |

(Continued)

OTHER PUBLICATIONS

Notice of Reasons for Refusal for corresponding Japanese Application No. 2020-541163, dated Nov. 30, 2021, with English translation (10 pages).

(Continued)

*Primary Examiner* — Hoan H Tran
(74) *Attorney, Agent, or Firm* — Harness, Dickey & Pierce, P.L.C.

(57) ABSTRACT

An electroconductive roll includes a core member, a rubber base material disposed around the core member, and a surface layer disposed around the rubber base material. The arithmetic mean peak curvature $S_{pc}$ of a surface of the surface layer is equal to or greater than 1,880 (1/mm), and is equal to or less than 14,024 (1/mm).

3 Claims, 2 Drawing Sheets

(56) References Cited

FOREIGN PATENT DOCUMENTS

| | | | |
|---|---|---|---|
| JP | H10-186804 | A | 7/1998 |
| JP | 2005-091414 | A | 4/2005 |
| JP | 2008-112150 | A | 5/2008 |
| JP | 2009288817 | * | 12/2009 |
| JP | 2010-096267 | A | 4/2010 |
| JP | 2012-014141 | A | 1/2012 |
| JP | 2015-121769 | A | 7/2015 |
| JP | 6252717 | B1 | 12/2017 |
| JP | 6303095 | B1 | 4/2018 |
| JP | 2018-132658 | A | 8/2018 |
| WO | 2020-050131 | A1 | 3/2020 |

OTHER PUBLICATIONS

Notice of Reasons for Refusal for corresponding Japanese Application No. 2020-541163, dated Oct. 3, 2021 (7 pages).
Notice of Reasons for Refusal for corresponding Japanese Application No. 2022-102555, dated Apr. 4, 2023, with English translation (15 pages).
International Search Report (English and Japanese) of the International Searching Authority issued in PCT/JP2019/033941, dated Oct. 21, 2019; ISA/JP.
Notice of Reasons for Refusal for corresponding Japanese Application No. 2022-102555, dated Jun. 13, 2023, with English translation (11 pages).

* cited by examiner

ELECTROCONDUCTIVE ROLL

CROSS REFERENCE TO RELATED APPLICATIONS

This application is a U.S. National Phase application of International Application No. PCT/JP2019/033941, filed on Aug. 29, 2019, which claims priority to Japanese Patent Application No. 2018-165845, filed on Sep. 5, 2018. The entire disclosures of the above applications are expressly incorporated by reference herein.

BACKGROUND

Technical Field

The present invention relates to electroconductive rolls used for charging rolls, etc. of image forming apparatuses.

Related Art

Image quality produced by an image forming apparatus such as an electrophotographic copying machine depends on uniformity of a charged state of the photoconductor element, which is affected by the surface roughness of a charging roll. JP-A-2015-121769, JP-A-2012-14141, and JP-A-2005-91414 are known as conventional techniques that relate to a surface roughness of charging rolls.

JP-A-2015-121769 describes a technique related to a charging member (charging roll) consisting of an electroconductive support, an electroconductive elastic layer laminated on the electroconductive support, and an electroconductive resin layer laminated as the outermost layer on the electroconductive elastic layer. The electroconductive resin layer contains a matrix material and at least one kind of particles selected from a group consisting of resin particles and inorganic particles, the particles containing first particles, in which A is 10 micrometers to 7.0 micrometers, B1/A is 5.0 to 30.0, and $S_m$ is 50 micrometers to 400 micrometers, where the thickness of a portion of the electroconductive resin layer formed by the matrix material alone is A [micrometers], the mean particle diameter of the particles is B1 [micrometers], and the inter-particle distance is $S_m$ [micrometers].

JP-A-2012-14141 discloses a technique that relates to an image forming apparatus including a positively-charged single-layer type electrophotographic photoconductor element; a charging device having a contact-type charging member for charging the surface of the photoconductor element; an exposure device for exposing the surface of the charged image carrier to form an electrostatic latent image on the surface of the image carrier; a developing device for developing the electrostatic latent image as a toner image; and a transfer device for transferring the toner image from the image carrier to a transfer object. The contact-type charging member is a charging roller made of electroconductive rubber and has an Asker-C rubber hardness of 62 degrees to 81 degrees, and a surface roughness of the charging roller of the contact-type charging member has a mean interval $S_m$ of 55 micrometers to 130 micrometers between surface irregularities, and a ten-point height irregularity $R_z$ of 9 micrometers to 19 micrometers.

JP-A-2005-91414 discloses a technique that relates to a charging roller including an electroconductive support, a roll-shaped semi-electroconductive elastic layer formed on the electroconductive support, and a protective layer formed on the surface of the semi-electroconductive elastic layer. The protective layer is formed by application of a coating liquid for forming the protective layer containing fine particles that prevent adhesion of an external substance to the protective layer, with the volume average particle diameter of the fine particles being refined such that the surface roughness of the protective layer is equal to or less than 1 micrometer.

An object of JP-A-2015-121769, JP-A-2012-14141, and JP-A-2005-91414 is to control a discharge between the charging roll and the photoconductor element to make the discharge as uniform as possible, which is achieved by adjusting a surface roughness of the outermost surface of the charging roll by use of fine particles in the surface layer, to thereby improve an image quality.

SUMMARY

Demand exists for image forming apparatuses that provide a high image quality.

The present invention provides an electroconductive roll that reduces image unevenness.

An electroconductive roll according to the present invention includes a core member, a rubber base material disposed around the core member, and a surface layer disposed around the rubber base material, with an arithmetic mean peak curvature $S_{pc}$ of a surface of the surface layer being equal to or greater than 1,880 (1/mm), and being equal to or less than 14,024 (1/mm). According to this aspect, image unevenness can be reduced.

Preferably, the surface layer includes an electroconductive matrix that contains a base material formed of an electric insulator and an electroconductive material being dispersed in the base material, and particles of a surface roughness enhancing material being dispersed in the electroconductive matrix.

Preferably, the particles of the surface roughness enhancing material are formed of an electric insulator.

DETAILED DESCRIPTION

An embodiment for carrying out the present invention will now be described in detail. Hereinafter, a charging roll will be described as an example of an electroconductive roll. In the drawings, the scale is not necessarily to scale, and some dimensions may be exaggerated for illustrative products or samples.

Figure 1:
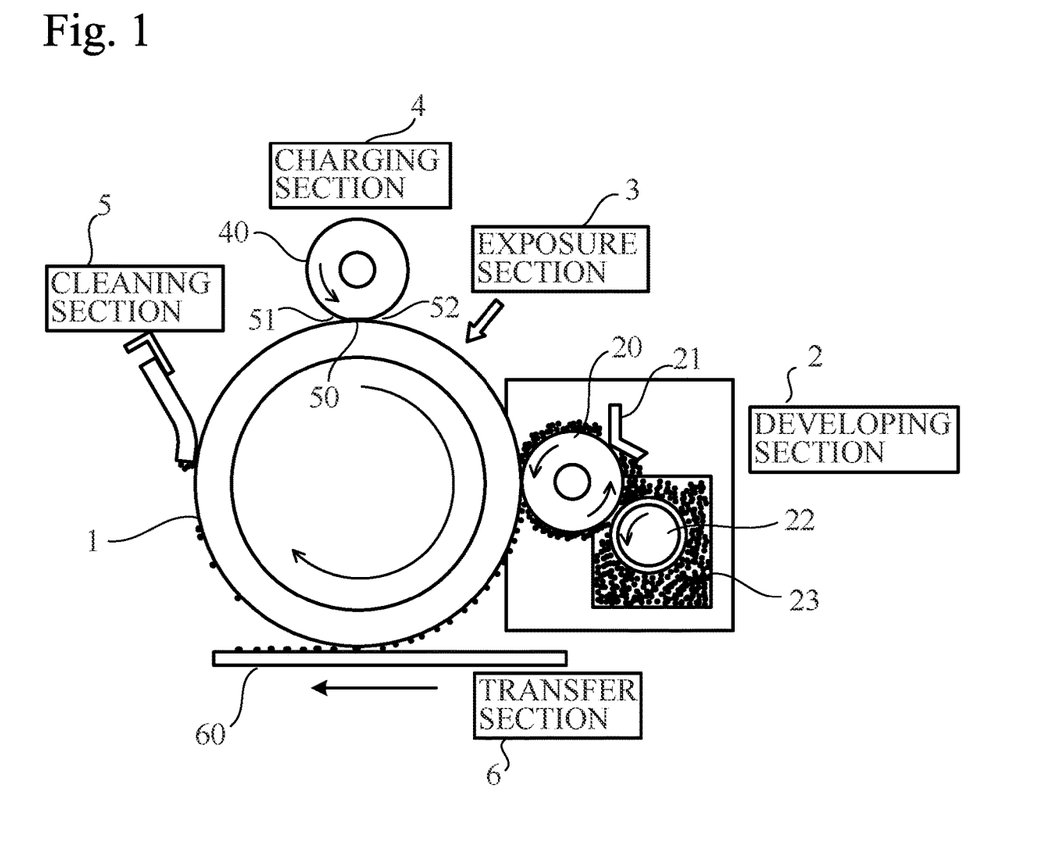
FIG. 1 is a schematic diagram showing an example of an image forming apparatus including a charging roll according to an embodiment of the present invention.

As shown in FIG. 1, an image forming apparatus according to an embodiment of the present invention includes a photoconductor element 1. Around the photoconductor element 1, a developing section 2, an exposure section 3, a charging section 4, a transfer section 6, and a cleaning section 5 are arranged. In the developing section 2, a developing roll 20, a regulating blade 21, and a supply roll 22 are disposed, and the toner 23 is stored. The charging section 4 is provided with a charging roll 40. The transfer section 6 transfers the toner image onto a sheet 60 of paper, which is a recording medium. The toner image transferred by the transfer section 6 is fixed by a fusing section (not shown).

The cylindrical and rotating photoconductor element 1 and the cylindrical and rotating charging roll 40 are in contact with each other at the nip 50. Discharge between the photoconductor element 1 and the charging roll 40 occurs in the region 51 in front of the nip 50 in the rotational direction of the photoconductor element 1 and the charging roll 40 (in some cases, in addition to discharge in the region 51 in front of the nip 50 discharge occurs in the region 52 behind the nip 50), whereby the surface of the photoconductor element 1 is charged. Preferably, the charged state of the surface of the photoconductor element 1 is uniform in both the circumferential direction and the axial direction of the photoconductor element 1.

Figure 2:
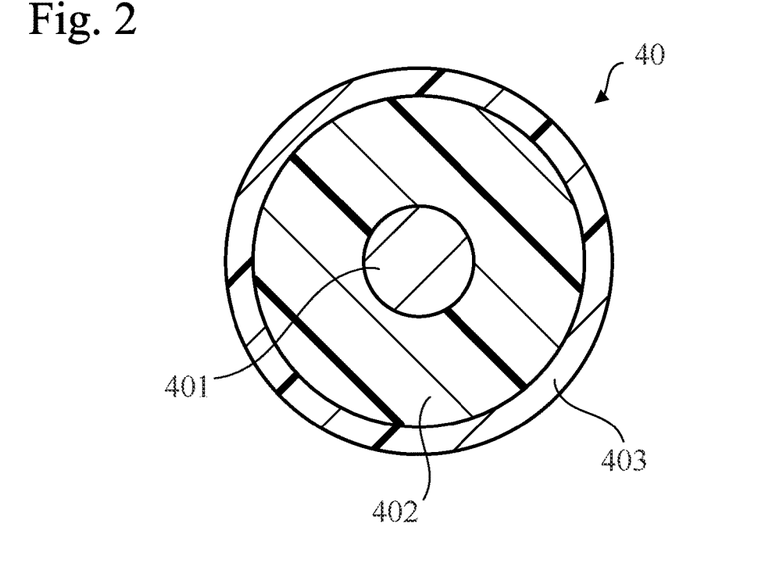
FIG. 2 is a cross-sectional view showing an example of the charging roll according to an embodiment of the present invention.

FIG. 2 is a cross-sectional view showing an example of a charging roll according to an embodiment of the present invention. As shown in FIG. 2, the charging roll 40 includes a core member 401, a rubber base material 402 formed on the outer peripheral surface of the core member 401, and a surface layer 403 coated on the outer peripheral surface of the rubber base material 402. By coating the outer peripheral surface of the rubber base material 402 with the surface layer 403 having a coating composition that is formed to have a suitable surface state, uneven discharge between the photoconductor element 1 and the charging roller 40 can be prevented and uniform discharge can be provided to the photoconductor element 1 such that the developing section 2 adheres to the surface of the photoconductor element 1 an amount of toner that accurately corresponds to the latent image formed by the exposing section 3.

Core Member

The core member 401 can be formed of a material, including, but not limited to, a metal or resin material having excellent thermal conductivity and mechanical strength, for example, a metal material such as stainless steel, nickel (Ni), nickel alloy, iron (Fe), magnetic stainless steel, and cobalt-nickel (Co—Ni) alloy, or a resin material such as PI (polyimide resin). The structure of the core member 401 is not particularly limited, and it may be hollow or not hollow.

Rubber Base Material

The rubber base material 402 is disposed on the outer peripheral surface of the core member 401, and is formed of electroconductive rubber having conductivity. The rubber base material 402 may be composed of a single layer or two or more layers. In addition, an adhesion layer, an adjustment layer, etc. may be interposed between the core member 401 and the rubber base material 402, as appropriate.

The rubber base material 402 can be formed by molding a rubber composition, which is obtained by adding a conductivity imparting material, a crosslinking agent, etc. to an electroconductive rubber, around the core member 401. Examples of the electroconductive rubber include polyurethane rubber (PUR), epichlorohydrin rubber (ECO), nitrile rubber (NBR), styrene rubber (SBR), and chloroprene rubber (CR).

As the conductivity imparting material, an electronic conductivity imparting material such as carbon black or metal powder, an ionic conductivity imparting material, or a mixture thereof can be used.

Examples of the ionic conductivity imparting material include organic salts, inorganic salts, metal complexes, and ionic liquids. An example of an organic salt is sodium trifluoride acetate, and examples of the inorganic salt includes lithium perchlorate and quaternary ammonium salt. An example of a metal complex is ferric halide-ethylene glycol, and specific examples thereof include those described in JP-B-3655364. The ionic liquid is a molten salt that is liquid at room temperature, and is referred to as a room temperature molten salt. The salt has a melting point of 70 degrees Celsius or less, preferably 30 degrees Celsius or less. Specific examples thereof include those described in JP-A-2003-202722.

The crosslinking agent is not particularly limited, and examples thereof include sulfur and a peroxide vulcanizing agent.

Furthermore, a crosslinking aid, etc. that promotes action of the crosslinking agent may be added to the rubber composition, as appropriate. Examples of the crosslinking aid include inorganic materials, such as zinc oxide and magnesium oxide, and organic materials, such as stearic acid and amines. In addition, to shorten a time taken to achieve crosslinking, a thiazole-based or other crosslinking accelerator may be used. Other additives may be added to the rubber composition, as appropriate.

In this embodiment, the surface of the rubber base material 402 formed on the outer peripheral surface of the core member 401 is first ground to a predetermined thickness with a grinding machine, after which the surface of the rubber base material 402 is subjected to dry grinding with a grinding wheel. The surface layer 403 is then formed on the outer peripheral surface of the rubber base material 402. Grinding is performed to adjust the surface roughness of the rubber base material 402 as appropriate, and to thereby adjust the surface state of the surface layer 403 formed on the outer peripheral surface of the rubber base material 402.

In a case in which the surface roughness of the rubber base material 402 is to be minimized, the surface roughness (ten-point height irregularities) $R_Z$ according to JIS B 0601 (1994) of the rubber base material 402 is preferably equal to or less than 8.5 micrometers. The surface roughness $R_Z$ is measured by a contact-type surface roughness meter.

Dry grinding is performed, for example, in a state in which the rubber base material 402 is rotated, by moving the rotary grinding wheel along the axial direction of the core member 401 while the wheel is in contact with the rubber base material 402 (traverse grinding). In a case in which the surface roughness of the rubber base material 402 is to be minimized, the number of revolutions of the grinding wheel of the grinding machine may be gradually increased, for example, from 1000 rpm, to 2000 rpm, to 3000 rpm. Alternatively, the coarseness of a grinding wheel may be progressively changed. For example, a GC (green carborundum) grinding wheel may be changed, for example, from a GC 60 wheel, to a GC 120 wheel, to a GC 220 wheel.

In addition, after the surface of the rubber base material 402 is dry-ground, the surface may be wet ground with a wet grinding machine in which a waterproof grinding paper such as waterproof sandpaper is employed, with the rubber base material 402 being brought into contact with the sandpaper under supply of a grinding liquid.

Rubber Hardness of Rubber Base Material

The rubber hardness of the base material 402 is measured by use of a durometer "Type A" according to JIS K 6253 and ISO 7619, and the hardness is preferably within a range from 50 degrees to 64 degrees.

The surface layer 403 formed on the rubber base material 402 is thin, and thus a hardness of the surface of the charging roll 40 is affected by a hardness of the rubber base material 402. In a case in which the hardness of the rubber base material 402 is less than 50 degrees, convex portions on the surface of the charging roll 40 are likely to be crushed and contaminate the photoconductor element 1, and cause image defects. On the other hand, if the hardness of the rubber base material 402 is greater than 64 degrees, convex portions on the surface of the charging roll 40 may affect the image.

Surface Layer

In this embodiment, a coating liquid is applied to the outer peripheral surface of the rubber base material 402 and dried and cured, thereby forming the surface layer 403. Application of the coating liquid may be carried out by dip coating, roll coating, spray coating, or the like.

Figure 3:
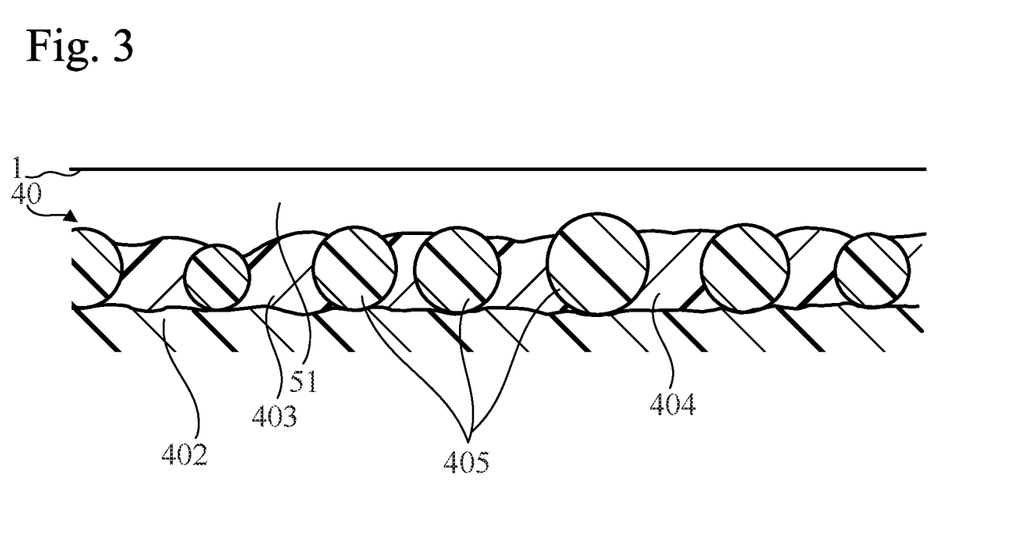
FIG. 3 is a cross-sectional view of a rubber base material and a surface layer cut along the axial direction of the charging roll.

As shown in FIG. 3, the cured surface layer 403 includes an electroconductive matrix 404 and particles 405 of a surface roughness enhancing material (also referred to as a roughness enhancing material), which may be, e.g., an electric insulator, dispersed in the electroconductive matrix 404. The particles 405 of the roughness enhancing material provide the surface layer 403 with an appropriate surface roughness. The electroconductive matrix 404 serves to hold the particles 405 of the roughness enhancing material in position and serves to effect discharge to the photoconductor element 1. The electroconductive matrix 404 contains a base material and an electroconductive material dispersed in the base material. As described above, discharge occurs between the charging roller 40 and the photoconductor element 1 in the region 51 (and in some cases in the region 52, also).

In the example shown in FIG. 3, the particles 405 of the roughness enhancing material are not completely embedded in the electroconductive matrix 404; however, they may be completely embedded. If the thickness of the electroconductive matrix 404 is small, the ability of the matrix to hold the particles 405 of the roughness enhancing material will also be low. Accordingly, it is preferable for the electroconductive matrix 404 to have a thickness that is appropriate relative to the diameter of the particles 405 of the roughness enhancing material. When the particles 405 of the roughness enhancing material are made of an electric insulator, when the thickness of the electroconductive matrix 404 is large, and when the electrical resistance of the electroconductive matrix 404 is large, discharge is less likely to occur. However, by increasing the proportion of the electroconductive material contained in the electroconductive matrix 404, the electrical resistance of the electroconductive matrix 404 can be reduced to facilitate occurrence of discharge.

In the present embodiment, the surface state of the surface layer 403 is adjusted by dispersing the particles 405 of the roughness enhancing material in the surface layer 403 formed on the rubber base material 402, of which the surface roughness is adjusted.

In the present embodiment, it would be preferable for the thickness of the electroconductive matrix 404 of the surface layer 403 to be within an appropriate numerical range. It is contemplated that if the thickness is too large, the surface roughness of the surface layer 403 will be too small resulting in image unevenness.

Furthermore, in the present embodiment, it would be preferable for the amount of the particles 405 of the roughness enhancing material in the surface layer 403 to be within an appropriate numerical range. It is contemplated that if the amount of the particles is large, the particles may overlap, causing the surface of the surface layer 403 to be rough, and resulting image unevenness.

In this embodiment, the composition of the coating liquid that is the material of the surface layer 403 contains at least the base material, the electroconductive material, and the particles 405 of the surface roughness enhancing material. After curing of the coating liquid, the base material and the electroconductive material become components of the electroconductive matrix 404.

The coating liquid is obtained, for example, by dissolving in a diluent solvent the following components.

Base material, 10 to 80 parts by weight;

electroconductive material, 1 to 50 parts by weight; and surface roughness enhancing material, 70% by weight or less of the total amount of the coating liquid.

It is contemplated that when the surface state of the surface layer 403 is appropriate, discharge between the charging roll 40 and the photoconductor element 1 will be substantially uniform in the gap before the nip, at which the charging roll 40 and the photoconductor element 1 are in contact with each other, so that uneven discharge will not occur upon image formation, whereby an image of a desired density will be formed, with an end result of provision of high image quality.

It is considered that the surface state of the surface layer 403 can be adjusted as appropriate by adjusting the particle diameter and the amount of the particles 405 of the surface roughness enhancing material.

Base Material

The base material contained in the coating liquid is an electric insulator. Examples of the base material include urethane resin, acrylic resin, acrylic urethane resin, amino resin, silicone resin, fluorine resin, polyamide resin, epoxy resin, polyester resin, polyether resin, phenol resin, urea resin, polyvinylbutyral resin, melamine resin, nylon resin, etc. The base materials may be used alone or in combination.

Electroconductive Material

Examples of the electroconductive material contained in the coating liquid include a carbon black such as acetylene black, Ketjen black, and Tokablack, a carbon nanotube, an ion such as lithium perchloride, an ionic liquid such as 1-butyl-3-methylimidazolium hexafluorophosphate, and a metal oxide such as tin oxide, and an electroconductive polymer. These electroconductive materials may be used alone or in combination.

Surface Roughness Enhancing Material

Examples of the particles 405 of the surface roughness enhancing material contained in the coating liquid include acrylic particles, urethane particles, polyamide resin particles, silicone resin particles, fluororesin particles, styrene resin particles, phenol resin particles, polyester resin particles, olefin resin particles, epoxy resin particles, nylon resin particles, carbon, graphite, carbide balloon, silica, alumina, titanium oxide, zinc oxide, magnesium oxide, zirconium oxide, calcium sulfate, calcium carbonate, magnesium carbonate, calcium silicate, aluminum nitride, boron nitride, talc, kaolin clay, diatomaceous earth, glass beads, hollow glass spheres, etc. These particles may be used alone or in combination.

It is considered that there is a preferable range with respect to the relationship between the particle diameter and the amount of the particles 405 of the surface roughness enhancing material in the coating liquid in order to improve the image quality.

Diluent Solvent

The diluent solvent contained in the coating liquid is not particularly limited, and examples thereof include an aqueous-based solvent or other solvents such as methyl acetate, ethyl acetate, butyl acetate, methyl ethyl ketone (MEK), methyl isobutyl ketone (MIBK), methanol, ethanol, butanol, 2-propanol (IPA), acetone, toluene, xylene, hexane, heptane, and chloroform.

Working Examples

Hereinafter, working examples of the present embodiment will be described in greater detail.

Experiment 1

Preparation of Rubber Base Material

A rubber composition obtained by adding 0.5 parts by weight of sodium trifluoroacetate (as a conductivity imparting material), 3 parts by weight of zinc oxide, 2 parts by weight of stearic acid, and 1.5 parts by weight of a crosslinking agent to 100 parts by weight of epichlorohydrin rubber ("Epichlomer CG-102" manufactured by Osaka Soda Co., Ltd., Osaka, Japan) was kneaded with a roll mixer.

The kneaded rubber composition was formed into a sheet material and wound around the surface of a core member 401 having a diameter of 6 mm. The sheet material was press-molded to form a rubber base material 402 made of crosslinked epichlorohydrin rubber.

The hardness of the resulting rubber base material 402 was measured using a durometer "Type A" according to JIS K 6253 and ISO 7619. The measured hardness was within a range from 50 degrees to 64 degrees.

Grinding Surface of Rubber Base Material

The surface of the rubber base material 402 was ground with a grinding machine. More specifically, the surface of the obtained rubber base material 402 was ground with a grinding machine to provide the rubber base material 402 with a predetermined thickness (1.25 mm), followed by dry grinding in which the rotation speed of the grinding wheel of the grinding machine was gradually increased from 1000 rpm, to 2000 rpm, to 3000 rpm. That is, in Experiment 1, the surface roughness of the rubber base material 402 was minimized.

Preparation of Coating Liquid

A coating liquid for forming the surface layer 403 on the outer peripheral surface of the rubber base material 402 described above was prepared.

The composition of the coating liquid is as shown in Table 1.

TABLE 1

Composition of Coating Liquid

| Function | Material | Material Details | Ratio (Parts by Weight) |
|---|---|---|---|
| Diluent Solvent | Ethyl Acetate | | 60.0 |
| Base Material | Urethane Resin | | 19.9 |
| | Contents of Base Material | | |
| | Polyol | "T5650E" Manufactured by Asahi Kasel Chemicals Corp. | 10.8 |
| | Isocyanurate | "TPA-100" Manufactured by Asahi Kasel Chemicals Corp. (Tokyo, Japan) | 9.1 |
| Electroconductive Material | Carbon Dispersed Liquid | "MHI-BK" (Including 20 to 30 Weight % of Carbon) Manufactured by Mikuni Color Ltd. (Hyogo, Japan) | 18.4 |
| Additive | Acrylic Silicone Polymer | "MODIPER FS-700" Manufactured by NOF Corp. (Tokyo, Japan) | 1.0 |
| Surface Roughness Enhancing Material | Urethane Particles | Urethane Beads Manufactured by Negami Chemical Industrial Co., Ltd. (Tokyo, Japan) | See Table 2 |

Urethane beads manufactured by Negami Chemical Industrial Co., Ltd. (Tokyo, Japan) were used as the urethane particles.

The relationship between the average particle diameter of the urethane beads and the product name is as follows. It is of note that in practice, one product contains particles having diameters that differ from the average particle diameter.

6 micrometers: Urethane beads "C-800"

10 micrometers: Urethane beads "C-600"

15 micrometers: Urethane beads "C-400"

22 micrometers: Urethane beads "C-300"

In Experiment 1, samples having different surface conditions of the surface layer 403 were produced by applying coating liquids containing particles 405 of the surface roughness enhancing material having different particle diameters and in different amounts. The particle diameters and amounts of particles 405 in the samples are as shown in Table 2. In Table 2, samples 1 to 11 are samples of Experiment 1. However, in sample 5, the particles 405 of the roughness enhancing material are not included in the surface layer 403.

The coating liquid having the above composition was stirred with a ball mill for 3 hours.

TABLE 2

|  | Arithmetic Mean Peak Curvature $S_{pc}$ [1/mm] | Average Particle Diameter of Surface Roughness Enhancing Material [μm] | Amount of Surface Roughness Enhancing Material in Coating Liquid [wt %] | Image Unevenness | | Image Comprehensive Judgment |
|---|---|---|---|---|---|---|
|  |  |  |  | Local Discharge | Scumming |  |
| Sample 1 | 1.849 | 15 | 2 | Bad | Bad | Bad |
| Sample 21 | 1.880 | 22 | 7 | Good | Good | Good |
| Sample 22 | 2.328 | 10 | 7 | Good | Good | Good |
| Sample 2 | 2.379 | 22 | 2 | Good | Good | Good |
| Sample 3 | 2.488 | 10 | 2 | Good | Good | Good |
| Sample 23 | 2.490 | 15 | 7 | Good | Good | Good |
| Sample 4 | 2.514 | 10 | 2 | Good | Good | Good |
| Sample 5 | 2.605 | 0 | 0 | Good | Good | Good |
| Sample 6 | 2.727 | 10 | 2 | Good | Good | Good |
| Sample 7 | 3.029 | 10 | 2 | Good | Good | Good |
| Sample 8 | 3.180 | 6 | 10 | Good | Good | Good |
| Sample 9 | 3.452 | 6 | 2 | Good | Good | Good |
| Sample 24 | 3.458 | 22 | 15 | Good | Good | Good |
| Sample 25 | 3.510 | 10 | 15 | Good | Good | Good |
| Sample 26 | 3.540 | 15 | 15 | Good | Good | Good |
| Sample 27 | 3.889 | 32 | 28 | Good | Good | Good |
| Sample 28 | 4.481 | 32 | 40 | Good | Good | Good |
| Sample 29 | 4.766 | 22 | 60 | Good | Good | Good |
| Sample 30 | 4.817 | 32 | 60 | Good | Good | Good |
| Sample 10 | 5.033 | 6 | 20 | Good | Good | Good |
| Semple 31 | 5.237 | 22 | 40 | Good | Good | Good |
| Sample 32 | 5.777 | 6 | 28 | Good | Good | Good |
| Sample 33 | 10.561 | 15 | 28 | Good | Good | Good |
| Sample 34 | 13.518 | 10 | 28 | Good | Good | Good |
| Sample 35 | 14.024 | 15 | 40 | Good | Good | Good |
| Sample 11 | 17.011 | 15 | 40 | Bad | Bad | Bad |

Preparation of Charging Roll

The surface layer 403 was formed by applying the coating liquid to the outer peripheral surface of the ground rubber base material 402, to manufacture a charging roll 40. Specifically, the coating liquid was stirred, and the liquid was spray-coated on the surface of the rubber base material 402, and dried in an electric furnace at 120 degrees Celsius for 60 minutes to form the surface layer 403 on the outer peripheral surface of the rubber base material 402, to produce a charged roll.

Measurement of Arithmetic Mean Peak Curvature $S_{pc}$

The arithmetic mean curvature $S_{pc}$ at the surface of the surface layer 403 (conforming to ISO 25178) was measured.

First, the surface of the central portion in the axial direction of the charging roll 40 was photographed with a non-contact type laser microscope. The laser microscope used was a "VK-X200" manufactured by Keyence Corporation (Osaka, Japan). Magnification was 400 times, and the photographic field of view was 528.7 micrometers along the circumferential direction of the charging roll 40 and was 705.1 micrometers along the axial direction of the charging roll 40.

Next, using Version 1 2.0.116 of the multi-file analysis application "VK-H1XM" produced by Keyence Corporation, the second-order curved surface correction was performed for the geometric data obtained by photographing. Second-order curved surface correction is a process of removing data components corresponding to the cylindrical surface of the charging roll 40 from the geometrical data obtained by photographing. In other words, it is a process of converting the geometric data on the cylindrical surface obtained by photographing into geometric data on a plane.

Thereafter, the arithmetic mean peak curvature $S_{pc}$ was calculated by this application. The value of Wolf pruning in the computation of the arithmetic mean peak curvature $S_{pc}$ was 5%. In other words, the arithmetic mean peak curvature $S_{pc}$ was calculated from regions having an amplitude greater than 5% of the maximum amplitude (the difference between the maximum height and the minimum height) in the contour curve. The arithmetic mean peak curvature $S_{pc}$ thus obtained is shown in Table 2.

Evaluation of Image Unevenness and Discharge Unevenness

An image evaluation test of the samples of the charging roll was conducted using a copying machine. The copying machine was a color multifunction peripheral (MFP) "bizhub C3850" (DC-voltage supply type) manufactured by Konica Minolta Inc. (Tokyo, Japan).

The applied charging voltage was measured with a tester. In Experiment 1, a voltage (REF—100 V), which was 100 V lower than the normal voltage (REF), was applied by way of an external power supply.

The charging roll was applied to the copying machine, and image unevenness was evaluated for images (halftone images and white solid images) printed under the conditions described below. The results are shown in Table 2.

For the image unevenness evaluation, occurrence of local discharge was judged on the basis of the halftone images, and lightness was judged on the basis of the white solid images. Occurrence of local discharge was confirmed by visual detection of white spots, black spots, white streaks, or black streaks in the halftone images.

Printing Conditions

Applied voltage: REF—100 V

Speed: 38 sheets/minute

Printing environment: The temperature was 23 degrees Celsius and the humidity was 55%.

Local Discharge Evaluation

For the halftone images, occurrence of image unevenness caused by local discharge was evaluated by visual observation using the following criteria.

Good: No image unevenness caused by local discharge.

Bad: Image unevenness caused by local discharge.

Lightness Determination

The L* value (lightness) was measured at seven points in each image by a chroma meter, "CR-400" manufactured by Konica Minolta Inc. The lightness was evaluated with the following evaluation criteria. The reason why the lightness was measured was to determine whether scumming, i.e., fogging (printing on a non-print area) occurred.

Evaluation Criteria

Good: No scumming. (L* is 95.5 or more)

Bad: Scumming. (L* is lower than 95.5)

Samples in which image unevenness occurred due to local discharge or scumming were judged to be bad in image comprehensive judgment, and these were described in Table 2.

Experiment 2

Preparation of Rubber Base Material

A rubber composition obtained by adding 0.5 parts by weight of sodium trifluoroacetate (as a conductivity imparting material), 3 parts by weight of zinc oxide, 2 parts by weight of stearic acid, and 1.5 parts by weight of a cross-linking agent to 100 parts by weight of epichlorohydrin rubber ("Epichlomer CG-102" manufactured by Osaka Soda Co., Ltd. was kneaded with a roll mixer.

The kneaded rubber composition was formed into a sheet material and wound around the surface of a core member 401 having a diameter of 8 mm. The sheet material was press-molded to form a rubber base material 402 made of crosslinked epichlorohydrin rubber.

The hardness of the resulting rubber base material 402 was measured using a durometer "Type A" according to JIS K 6253 and ISO 7619. The measured hardness fell within a range from 50 degrees to 64 degrees.

Grinding Surface of Rubber Base Material

The surface of the rubber base material 402 was ground with a grinding machine. More specifically, the surface of the obtained rubber base material 402 was ground with a grinding machine to provide the rubber base material 402 with a predetermined thickness (2 mm), after which dry grinding was applied. In Experiment 2, the rotation speed of the grinding wheel was not changed.

Preparation of Coating Liquid

A coating liquid for forming the surface layer 403 on the outer peripheral surface of the rubber base material 402 described above was prepared.

The composition of the coating liquid is shown in Table 1.

Urethane beads manufactured by Negami Chemical Industrial Co., Ltd. (Tokyo, Japan) were used as the urethane particles.

The relationship between the average particle diameter of the urethane beads and the product name is as follows. It is of note that in practice, one product contains particles having diameters that differ from the average particle diameter.

6 micrometers: Urethane beads "C-800"
10 micrometers: Urethane beads "C-600"
15 micrometers: Urethane beads "C-400"
22 micrometers: Urethane beads "C-300"
32 micrometers: Urethane beads "C-200"

In Experiment 2, samples having different surface conditions on the surface layer 403 were produced by applying coating liquids containing particles 405 of the surface roughness enhancing material having different particle diameters and in different amounts. The particle diameters and amounts of particles 405 in the samples are shown in Table 2. In Table 2, samples 21 to 35 are samples of Experiment 2.

The coating liquid having the above composition was stirred with a ball mill for 3 hours.

Preparation of Charging Roll

The surface layer 403 was formed by applying the coating liquid to the outer peripheral surface of the ground rubber base material 402, to manufacture a charging roll 40. Specifically, the coating liquid was stirred, and the liquid was spray-coated on the surface of the rubber base material 402, and dried in an electric furnace at 120 degrees Celsius for 60 minutes to form the surface layer 403 on the outer peripheral surface of the rubber base material 402, to produce a charged roll.

Measurement of Arithmetic Mean Peak Curvature $S_{pc}$

Using the same procedure as in Experiment 1, the arithmetic mean peak curvature $S_{pc}$ on the surface of the surface layer 403 was measured. The arithmetic mean peak curvature $S_{pc}$ is shown in Table 2.

Evaluation of Image Unevenness and Discharge Unevenness

An image evaluation test of the samples of the charging roll was conducted using a copying machine. The copying machine was a color multifunction peripheral (MFP) "MP C5503" (AC/DC voltage-superimposed supply type) manufactured by Ricoh Company, Ltd. (Tokyo, Japan).

The DC voltage was the normal voltage (REF), and the AC voltage $V_{pp}$ was controlled by the copying machine.

In Experiment 2, the alternating current was set at 1.45 mA, which is lower than the normal alternating current (REF) of the copying machine.

The charging roll was applied to the copying machine, and the image unevenness was evaluated for images (halftone images and white solid images) printed under the following printing conditions. The results are shown in Table 3. For the image unevenness evaluation, occurrence of local discharge was judged on the basis of the halftone images. Occurrence of local discharge was confirmed by visual detection of white spots, black spots, white streaks, or black streaks in the halftone images. Occurrence of scumming, i.e., fogging was judged by visual detection in the white solid images.

Printing Conditions

Speed: 30 sheets/minute

Printing environment: The temperature was 23 degrees Celsius and the humidity was 55%.

Local Discharge Evaluation

For the halftone images, occurrence of image unevenness caused by local discharge was judged by visual observation using the following criteria.

Good: No image unevenness caused by local discharge.

Bad: Image unevenness caused by local discharge.

Determination of Scumming

For the white solid images, occurrence of scumming, i.e., fogging (printing on a no-print area) was judged by visual observation.

Evaluation Criteria

Good: No scumming.

Bad: Scumming.

Samples in which image unevenness caused by local discharge or scumming occurred were judged to be bad using comprehensive image judgment, as described in Table 2.

As will be apparent from Table 2, whereas image unevenness occurred in Samples 1 and 11, good images were generated in the other samples.

Accordingly, it is preferable for the arithmetic mean peak curvature $S_{pc}$ of the surface of the surface layer 403 to be equal to or greater than 1,880 (1/mm) and to be equal to or less than 14,024 (1/mm).

Although the charging roll has been described as an embodiment, the electroconductive roll according to the present invention can be applied to a developing roll, a transfer roll, a charge removing roll, a toner supply roll, and others in addition to the charging roll of an image forming apparatus such as an electrophotographic copying machine or a printer.

The invention claimed is:

1. An electroconductive roll comprising:
    a core member;
    a rubber base material disposed around the core member; and
    a surface layer disposed around the rubber base material,
    an arithmetic mean peak curvature $S_{pc}$ of a surface of the surface layer being equal to or greater than 1,880 (1/mm) and being equal to or less than 14,024 (1/mm).

2. The electroconductive roll according to claim 1, wherein the surface layer comprises an electroconductive matrix comprising a base material formed of an electric insulator and an electroconductive material being dispersed in the base material, and particles of a surface roughness enhancing material being dispersed in the electroconductive matrix.

3. The electroconductive roll according to claim 2, wherein the particles of the surface roughness enhancing material are formed of an electric insulator.

* * * * *